United States Patent [19]

Hattori et al.

[11] 4,444,043

[45] Apr. 24, 1984

[54] KNOCKING DETECTOR FOR INTERNAL COMBUSTION ENGINE

[75] Inventors: Tadashi Hattori; Yoshiki Ueno, both of Okazaki; Osamu Kashima, Kariya; Masamichi Shibata, Toyota, all of Japan

[73] Assignees: Nippon Soken, Inc., Nishio; Nippondenso Co., Ltd., Kariya, both of Japan

[21] Appl. No.: 315,262

[22] Filed: Oct. 26, 1981

[30] Foreign Application Priority Data

Oct. 27, 1980 [JP] Japan .................... 55-151216

[51] Int. Cl.³ ............................. G01L 23/22
[52] U.S. Cl. .......................... 73/35; 73/116
[58] Field of Search ........... 73/35, 116; 123/425, 123/435; 313/129; 250/227

[56] References Cited

U.S. PATENT DOCUMENTS

| 1,433,530 | 10/1922 | Chapman | 313/129 X |
| 2,841,979 | 7/1958 | Harbert | 73/35 |
| 3,067,610 | 12/1962 | Bockemuehl et al. | 73/35 |
| 3,678,741 | 7/1972 | Burley | 73/116 |

FOREIGN PATENT DOCUMENTS

| 831166 | 2/1952 | Fed. Rep. of Germany | 73/35 |
| 263883 | 8/1927 | United Kingdom | 313/129 |

OTHER PUBLICATIONS

"National Bureau of Standards-Technical News Bulletin", vol. 37, No. 8, Aug. 1953, pp. 113-115.

Primary Examiner—James J. Gill
Attorney, Agent, or Firm—Cushman, Darby & Cushman

[57] ABSTRACT

A knocking detector for internal combustion engines includes an illumination detector for detecting the illumination intensity of combustion of the air-fuel mixture in the combustion chamber and a knocking discriminator for deciding whether or not a knocking has occurred on the basis of a signal produced from the illumination detector. The illumination detector is provided on the cylinder head of the internal combustion engine and is sensitive only to the light longer in wavelength than the near infrared rays.

2 Claims, 5 Drawing Figures

KNOCKING DETECTOR FOR INTERNAL COMBUSTION ENGINE

BACKGROUND OF THE INVENTION

This invention relates to an apparatus for detecting a knocking of an internal combustion engine from the light emitted during combustion in a cylinder of the internal combustion engine.

The deep correlation between ignition timing and the internal pressure in an engine cylinder is generally known. The internal pressure of the cylinder caused by the explosion of air-fuel mixture in the absence of a knocking does not carry a high frequency (normally a frequency component from 5 to 10 KHz and 11 and 15 KHz, which is a component in a frequency range determined by the bore diameter of the engine cylinder involved and the sound velocity at the time of combustion, and is caused by intermittent rapid combustion) but begins to carry such a high frequency near the maximum value of internal pressure in the presence of a knocking, resulting in a vibration or a noise being produced outside of the cylinder. A close look at the internal pressure signal generated in the cylinder or the manner in which the vibration or noise is generated out of the cylinder shows that at the initial stage of knocking (we call this trace knock), the high frequency component begins to occur at the crank angle associated with the maximum internal pressure, and when it develops into a larger knocking (we call this light or heavy knock), the high frequency component occurs at the crank angle advanced from the maximum value of the internal pressure. If the ignition timing is controlled by accurately detecting the vibration and noise generated out of the cylinder by a knock and by feeding back the result of a detection, therefore, the engine efficiency may be remarkably improved. There has not yet been developed any detector or sensor, however, which is capable of detecting accurately the knocking making up a feedback factor and is stably operable in adverse environments.

Conventional knocking detectors detect a knocking by detecting a vibration or a noise generated outside of the cylinder as described above. In the method of detecting a knocking outside of the cylinder, however, it is difficult to discriminate the vibration or noise of a high frequency caused by the knocking from the vibration or noise caused by the structure of the internal combustion engine or the automotive vehicle involved. Such a method thus poses a great problem of the need of a complicated discriminator circuit. A method of detecting a knocking by use of the pressure in the cylinder, on the other hand, is advantageous against external disturbances but has the disadvantage that the apparatus is exposed to a high temperature and a pressure sensor capable of stable operation in a rigid environment of vibrations is lacking.

SUMMARY OF THE INVENTION

After studying the above-mentioned problems from various angles, the inventors have discovered that in the presence of a knocking, the high frequency component of the combustion illumination changes in intensity in synchronism with the high frequency component of the internal pressure of the cylinder caused by the knocking. Accordingly, it is an object of the present invention to provide an apparatus resistant to external disturbances, which is capable of easily detecting a knocking of an internal combustion engine on the basis of the fact that a knocking can be easily detected by detecting the change in intensity of the high frequency component of the combustion illumination.

DESCRIPTION OF THE PREFERRED EMBODIMENTS

Figure 1:
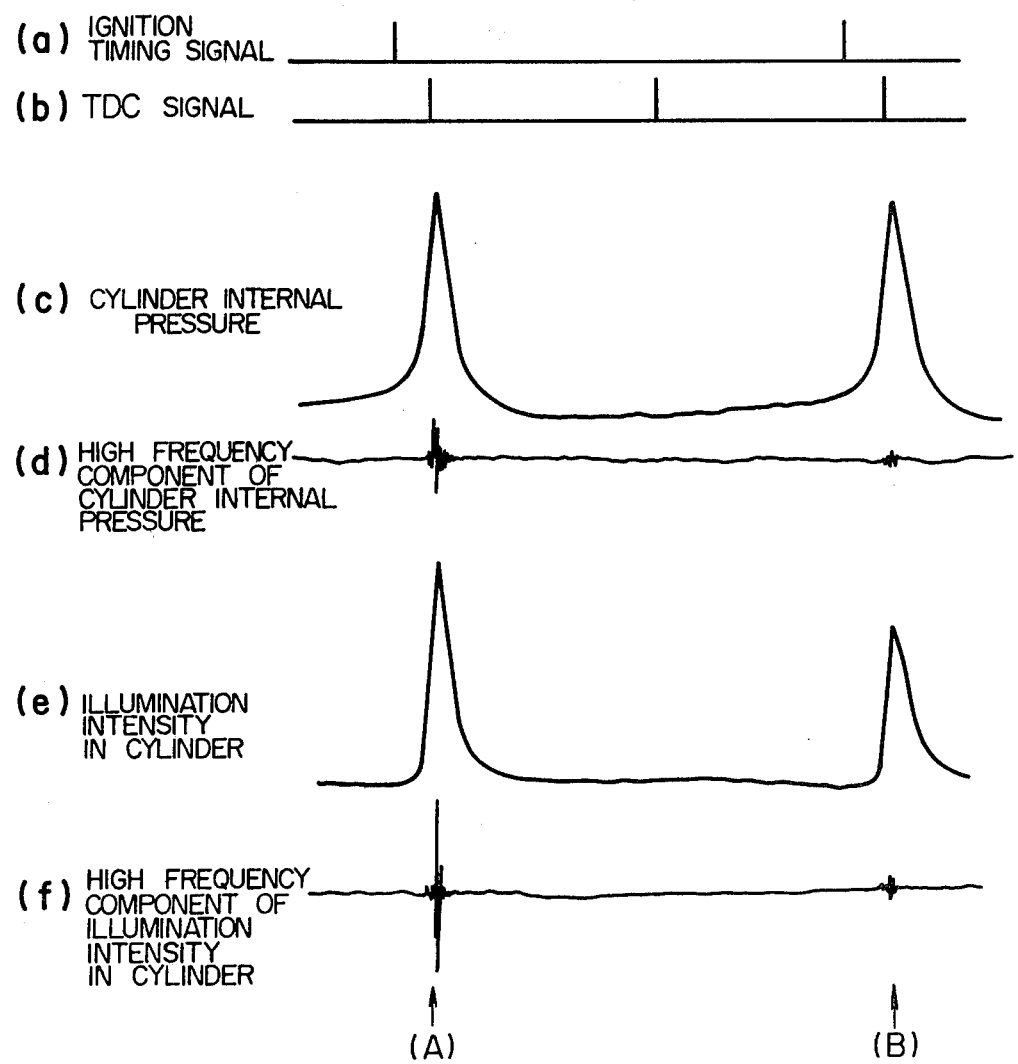
FIG. 1 is a characteristic diagram showing the internal pressure of a cylinder and the intensity of illumination.

An embodiment of the present invention will be described below with reference to the attached drawings. FIG. 1 shows the characteristics such as internal pressure of the cylinder and illumination intensity of a four-cylinder four-cycle spark ignition engine in the presence of a knocking. A waveform (a) of FIG. 1 shows an ignition timing signal, a waveform (b) of FIG. 1 a piston top dead center signal, a waveform (c) of FIG. 1 the internal pressure of a cylinder, a waveform (d) of FIG. 1 a high frequency component of the internal pressure of the cylinder after being passed through a band filter of 5 to 15 KHz described later, a waveform (e) of FIG. 1 an illumination intensity, and a waveform (f) of FIG. 1 the high frequency component of the illumination intensity after being passed through a band filter of 5 to 15 KHz. The characteristics of waveform (e) and (f) well correspond to those of waveforms (c) and (d) respectively. At point (A), soon after ignition, the high frequency components of both the internal pressure and the illumination intensity appear and reach a very high level at the maximum internal pressure, when a knocking is caused. At point (B), in contrast, a knocking is not caused and substantially no high frequency components are generated in the cylinder internal pressure or illumination intensity. The present invention is intended to detect a knocking from the high frequency component of illumination intensity and an embodiment thereof will be described below with reference to FIGS. 2, 3, 4 and 5.

Figure 2:
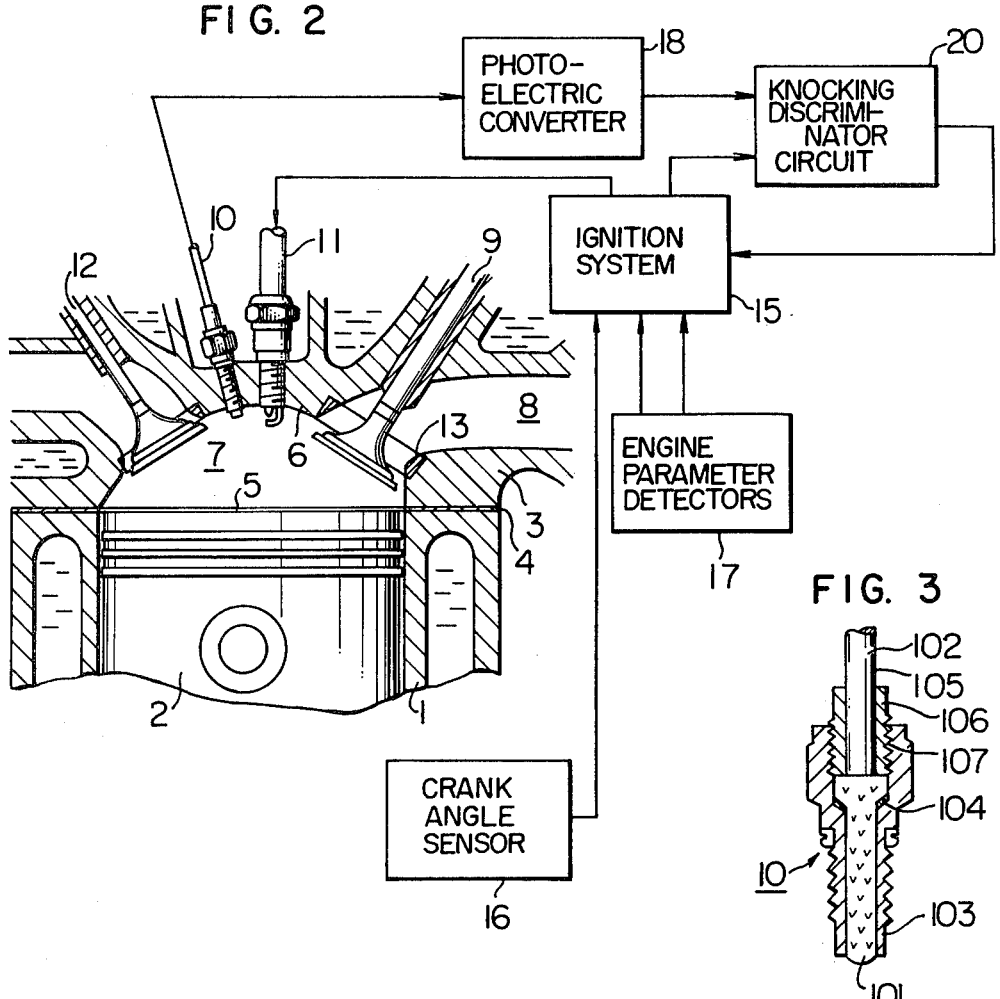
FIG. 2 is a partial sectional view showing an embodiment of the present invention.

A sectional view of a four-cycle spark ignition engine is shown in FIG. 2. Reference numeral 1 designates a cylinder block and numeral 2 a piston inserted in the cylinder block 1. A cylinder head 3 is coupled to the top of the cylinder block 1 through a gasket 4. A combustion chamber 7 is defined by the internal side 6 of the cylinder head and the top surface 5 of the piston 2. An intake port 8 opens to the cylinder head internal surface 6 in the vicinity of the outer periphery of the combustion chamber 7, and is arranged in such a manner that the central axis thereof is disclosed almost to the center of the cylinder block 1 in the vicinity of the opening in the combustion chamber that is, the intake valve 9.

Figure 3:
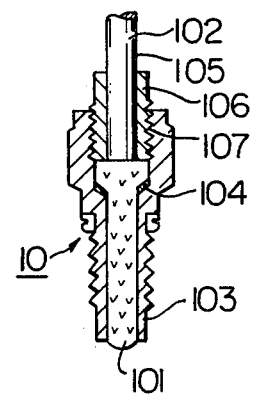
FIG. 3 is a sectional view showing the construction of an illumination detector included in FIG. 1.
Figure 5:
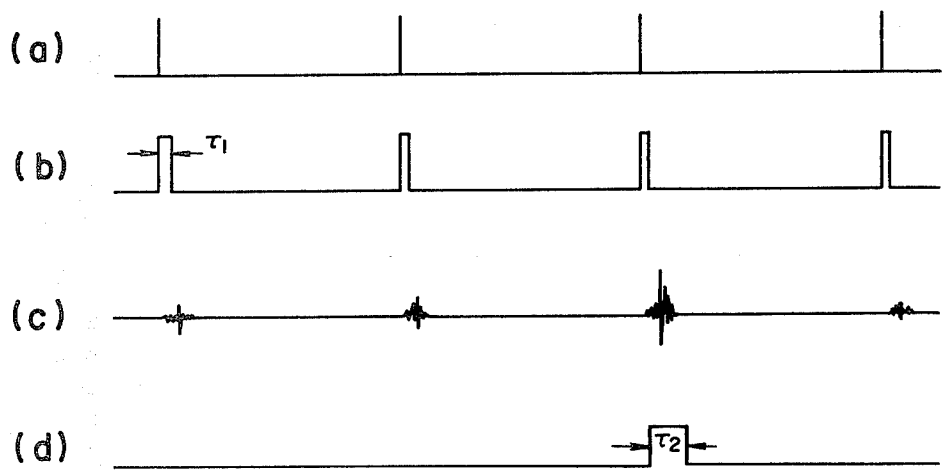
FIG. 5 is a time chart for explaining the operation of the apparatus according to the present invention.

A spark plug 11 is mounted at the central part of the combustion chamber 7 and an illumination detector 10 making up the essential part of photo-electric converter means is mounted directed toward the central part of the combustion chamber in the vicinity of the spark plug 11. Numeral 12 designates an exhaust valve, numeral 13 a valve seat, numeral 15 an ignition system for controlling the amount of ignition energy and ignition timing in response to output signals produced from a crank angle sensor 16, a knocking discriminator 20 and other engine parameter sensors 17. Numeral 18 designates a photo-electric converter for converting the light detected by the illumination detector 10 into an electrical signal. Numeral 20 designates a knocking discriminator circuit for identifying a knocking in response to the ignition timing signal produced from the ignition system 15 and the illumination intensity signal produced from the photo-electric converter 18. As shown in FIG. 3, the illumination detector 10 includes an illumination sensor 101 of quartz glass or sapphire with the hemispherical forward end thereof exposed to the combustion chamber and the opposite end thereof in the form of a flange, a light conductor 102 made of an optical fiber of quartz glass or the like for conducting the light from the illumination detector 101 to the photo-electric converter 18, a housing 103 made of a heat-resistant alloy of stainless steel and nickel, a seal member 104 of such a soft metal as Ni or Cn interposed between the housing 103 and the illumination detector 101, and a metal fitting 106 secured to the covering 105 of the light conductor 102 with a bonding agent. The fitting 106 and the housing 103 are secured to each other by a thread 107.

Figure 4:
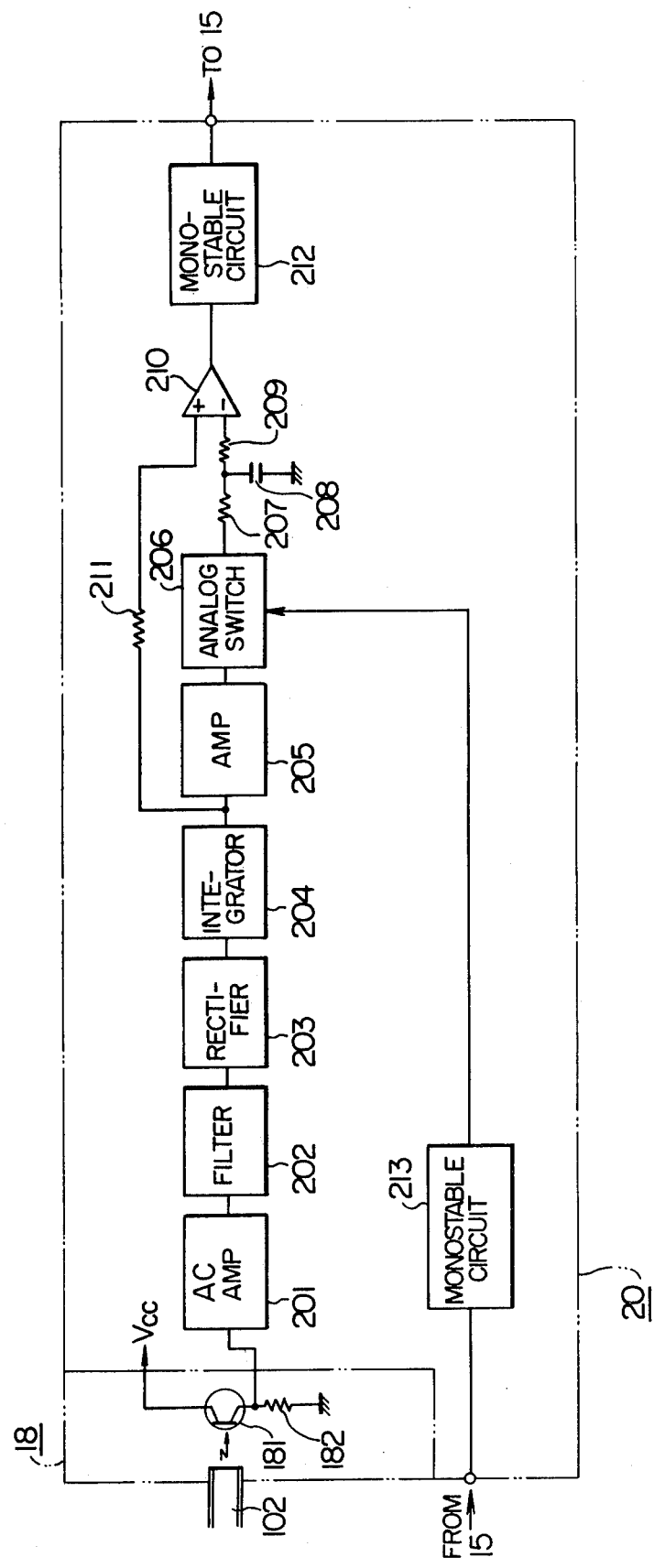
FIG. 4 is a diagram showing a configuration of a photo-electric converter and a knocking discriminator circuit included in FIG. 1.

It will be seen from FIG. 4 that the photo-electric converter 18 which together with the illumination detector 10 makes up the photo-electric converter means is for photo-electric conversion of that portion of the light from the light conductor 102 which is longer in wavelength than the near infrared rays through the photo transistor 181 and the emitter resistor 182 thereby to convert an illumination intensity into an electrical signal. The knocking discriminator circuit 20 includes an AC amplifier 201 for AC amplifying the output signal of the photo-electric converter 18, a filter 202 for passing only the high frequency component of the output signal of the AC amplifier 201 which is specific to knockings, a rectifier circuit 203 for full-wave or half-wave rectifying the signal produced from the filter 202, an integrator 204 for integrating and averaging the output of the rectifier circuit 203, an amplifier 205 for amplifying the signal output of the integrator 204 to a level K times larger, an analog switch 206 and a hold circuit having resistors 207, 209 and a capacitor 208. The knocking discriminator circuit 20 further includes a comparator circuit 210 for comparing the output of the hold circuit with the signal passed through the resistor 211, a monostable circuit 212, and a monostable circuit 213 for producing an on-off signal for the analog switch 206 in the form of "1" level signal continued for the time length of $\tau_1$ shown in FIG. 5(b) in synchronism with the rise of the ignition timing pulse from the ignition system 15 shown in FIG. 5(a) in response to the same ignition timing pulse. The analog switch 206 is turned on when the output signal of the monostable circuit 213 is at "1" level. The hold circuit charges the capacitor 208 with the output potential of the amplifier 205 associated with the turning on of the analog switch 206 for the time length of $\tau_1$. An average output circuit is comprised of the rectifier circuit 203, the integrator 204, the amplifier 205, the analog switch 206, the resistors 207, 209 and the capacitor 208. The output signal of the hold circuit is K times larger than the original signal thereof. When the input signal of the integrator circuit 204 is higher than the output signal of the hold circuit, the comparator 210 produces a "1" output signal, and when the output of the comparator 210 rises to "1" level, the monostable circuit 212 produces an output signal having a time width $\rho_2$ as shown in FIG. 5(d). In other words, when the input signal becomes higher than the value held to the width of $\tau_1$, an output signal having the time width of $\tau_2$ is produced.

Now, explanation will be made about the operation of the apparatus constructed as described above. When the engine enters the compression process thereby to effect a discharge at the spark plug 11, the mixture gas causes a flame nucleus which in turn develops into a flame within about 100 $\mu$sec to 1 msec. This flame extends into the combustion chamber, thus causing an illumination. In the absence of a knock, the illumination caused by the combustion does not contain any high frequency component specific to knockings while it contains such a high frequency component in the presence of a knocking. The light thus emitted is applied through the illumination detector 101 and the light conductor 102 to the photo-electric converter 18 for photo-electric conversion. The light thus subjected to photo-electric conversion is AC amplified by the AC amplifier 201 of the knocking discriminator 20 and is applied to the filter 202 for selectively picking up the high frequency component specific to knockings. In the presence of a knocking, the output of the filter 202 takes a very large vibration waveform while the vibration signal waveform is small in the absence of a knocking. This particular signal, after rectification, integration and amplification, is held through the analog switch 206 which is adapted to be turned on for the time length of $\tau_1$ in synchronism with the ignition timing. The illumination output at this time is compared with the signal thus held by the comparator 210. The time length $\tau_1$ provides what is called the ignition delay time from the flame nucleus to the flame. The illumination is so small that the signal held does not make up a noise signal caused by the change of combustion or the like, but always forms a base signal for illumination. In the presence of a knocking where the output signal of the integrator 204 is larger than the signal held at the holding circuit, the output of the comparator circuit 210 is "1" and the monostable circuit 212 produces a signal of "1" level for the time length of $\tau_1$ indicative of the generation of a knocking. This signal is applied to the ignition system 15 where the delay angle control of the ignition timing is effected. In the absence of a knocking, by contrast, the output signal of the integrator 204 is smaller than the signal produced from the holding circuit so that the output of the monostable circuit 212 remains at "0" level and the delay angle control is not effected.

In the case of the above-mentioned embodiment, the photo-electric converter 18 detects the light having a longer wavelength than the near infrared rays, and therefore the photo-electric converter does not detect ultraviolet rays generated by the discharge at the spark plug, thereby preventing any erroneous detection of a knocking. Also, the illumination detector 10, which may be made of such heat resistant and pressure resistant parts as sapphire or quartz glass, is capable of detecting the illumination in stable manner under rigid conditions.

In the above-mentioned embodiment, the signal obtained by integrating the signal after the filter 202 is held for a predetermined length of time on the basis of the ignition timing pulse signal, and this signal thus held is compared with the integration signal. As an alternative method, the integration signal may be held for a predetermined crank angle or an average of the integration signal for several cycles may be used as a substitute for the hold signal.

Unlike in the above-described embodiment where the signal obtained by integrating the signal after photo-electric conversion is compared with the signal held, the signal before integration may be compared with the signal held with equal effect.

Further, instead of using optical fiber as the light conductor 102 of the illumination detector 10 to introduce the light into the photo-electric converter 18, the photo-electric converter may be disposed within the illumination detector.

Also, the photo-transistor of the photo-electric converter may be replaced by a photo-electric converter element such as a photo-diode.

Furthermore, a filter for selectively passing the light having a wavelength longer than the near infrared rays may be provided on the illumination detector thereby to remove the ultraviolet rays from the spark plug.

It will be understood from the foregoing description that according to the present invention, the illumination intensity at the time of combustion of the mixture gas taken into the internal combustion engine is detected and converted into an electrical signal. The high frequency component specific to knocking is picked up from this signal by means of a filter thereby to decide whether or not a knocking has occurred. As a result, this invention has a great advantage that a knocking can be detected with an accurate and simple system without being affected by the external disturbances other than a knocking.

We claim:

1. A knocking detector for an internal combustion engine having a combustion chamber, including:
   an illumination detector mounted on the internal combustion engine and having an illumination sensor with a hemispherical forward end and exposed to the combustion chamber and made of a transparent material;
   photo-electric converting means for receiving from said illumination detector the illumination intensity of combustion of the air-fuel mixture in the combustion chamber and for converting the received illumination into an electrical signal in response to the intensity of the received illumination; and
   knocking discriminating means for receiving said electrical signal from said photo-electric converting means and for discriminating whether knocking has occurred, said discriminating means comprising:
   (a) filter means for receiving the electrical signal from said photo-electric converting means and for generating a high pass signal related to the high frequency components thereof,
   (b) integrating means for integrating the high pass signal from said filter means,
   (c) an amplifier for amplifying the integrated signal from said integrating means,
   (d) holding means for holding the amplified signal from said amplifier which is produced during a predetermined period beginning at the time of combustion, and
   (e) a comparator for comparing the integrated signal from said integrating circuit with the amplified signal held in said holding means, to thereby discriminate whether knocking has occurred.

2. A knocking detector according to claim 1, wherein said photo-electric converting means is sensitive to light having a longer wavelength than the near infrared rays.

* * * * *